United States Patent
Jayakeerthy et al.

(10) Patent No.: US 9,992,285 B2
(45) Date of Patent: *Jun. 5, 2018

(54) TECHNIQUES TO MANAGE STATE INFORMATION FOR A WEB SERVICE

(71) Applicant: MICROSOFT TECHNOLOGY LICENSING, LLC, Redmond, WA (US)

(72) Inventors: Arunkumar Thippur Jayakeerthy, Bellevue, WA (US); Benjamin E. Rampson, Woodinville, WA (US); Nickolas D. Welton, Seattle, WA (US); Christopher J. Gross, Redmond, WA (US); Michael G. Davenport, Seattle, WA (US); Martin R. Calsyn, Seattle, WA (US); Catalin I. Tomai, Seattle, WA (US); Andrew G. Carlson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/618,553

(22) Filed: Jun. 9, 2017

(65) Prior Publication Data

US 2017/0289260 A1 Oct. 5, 2017

Related U.S. Application Data

(63) Continuation of application No. 14/101,201, filed on Dec. 9, 2013, now Pat. No. 9,712,622.
(Continued)

(51) Int. Cl.
*G06F 15/16* (2006.01)
*H04L 29/08* (2006.01)
(Continued)

(52) U.S. Cl.
CPC .......... *H04L 67/14* (2013.01); *G06F 17/3089* (2013.01); *H04L 67/02* (2013.01); *H04L 67/142* (2013.01)

(58) Field of Classification Search
USPC ........................................................ 709/203
See application file for complete search history.

(56) References Cited

U.S. PATENT DOCUMENTS

| 7,895,296 B1 | 2/2011 | Dayan |
| 2002/0038388 A1 | 3/2002 | Netter |

(Continued)

OTHER PUBLICATIONS

"Final Office Action Issued in U.S Appl. No. 14/101,201", dated Nov. 3, 2016, 11 Pages.

(Continued)

*Primary Examiner* — Hee Soo Kim

(57) ABSTRACT

Techniques to manage state information for a web service are described. An apparatus may comprise a processor circuit, and an application program for execution by the processor circuit to provide a set of operations to modify a state of a network resource provided by a network service. The application program may comprise a state manager component arranged to record state information for the network resource provided by the network service as state changes occur to the network resource during a first communication session, and store a resource identifier and associated state information for the network resource in a state database, the state information for use in automatically reproducing a state of the network resource during a second communication session. Other embodiments are described and claimed.

20 Claims, 12 Drawing Sheets

Related U.S. Application Data

(60) Provisional application No. 61/846,250, filed on Jul. 15, 2013.

(51) Int. Cl.
*G06F 17/30* (2006.01)
*G06F 15/177* (2006.01)

(56) References Cited

U.S. PATENT DOCUMENTS

| | | |
|---|---|---|
| 2002/0087657 A1 | 7/2002 | Hunt |
| 2002/0090934 A1 | 7/2002 | Mitchelmore |
| 2009/0222727 A1 | 9/2009 | George et al. |
| 2010/0125802 A1 | 5/2010 | Huslak et al. |
| 2010/0153866 A1 | 6/2010 | Sharoni |
| 2011/0145694 A1 | 6/2011 | Graves et al. |
| 2012/0010995 A1 | 1/2012 | Skirpa et al. |
| 2013/0013671 A1 | 1/2013 | Relan et al. |

OTHER PUBLICATIONS

"Non-Final Office Action Issued in U.S Appl. No. 14/101,201", dated May 20, 2016, 12 Pages.

"Notice of Allowance Issued in U.S Appl. No. 14/101,201", dated Mar. 27, 2017, 7 Pages.

"International Search Report and Written Opinion Issued in PCT Application No. PCT/US2014/046455", dated Nov. 27, 2014, 11 Pages.

Nowicki, Bill, "NFS: Network File System Protocol Specification", In Network Working Group Request for Comments: 1094, Sun Microsystems, Inc., Mar. 31, 1989, 27 Pages.

"Office Action Issued in European Patent Application No. 14755439.8", dated Feb. 23, 2016, 2 Pages.

"Notice of Allowance Issued in European Patent Application No. 14755439.8", dated Apr. 5, 2017, 7 Pages.

"Notice of Allowance Issued in European Patent Application No. 14755439.8", dated Nov. 23, 2016, 7 Pages.

"Second Written Opinion Issued in PCT Application No. PCT/US2014/046455", dated Jul. 3, 2015, 7 Pages.

"International Preliminary Report on Patentability Issued in PCT Application No. PCT/US2014/046455", dated Oct. 22, 2015, 8 Pages.

400

```
┌─────────────────────────────────────────┐
│  RECEIVE A CONTROL DIRECTIVE TO MODIFY A WEB  │
│  RESOURCE PROVIDED BY A WEB SERVICE           │
│                  402                          │
└─────────────────────────────────────────┘
                    │
┌─────────────────────────────────────────┐
│  SEND A FIRST REQUEST FROM AN APPLICATION PROGRAM │
│  TO THE WEB SERVICE TO MODIFY THE WEB RESOURCE    │
│  FROM A FIRST STATE TO A SECOND STATE             │
│                  404                              │
└─────────────────────────────────────────┘
                    │
┌─────────────────────────────────────────┐
│  RECEIVE A RESPONSE FROM THE WEB SERVICE WITH THE │
│  WEB RESOURCE IN THE SECOND STATE                 │
│                  406                              │
└─────────────────────────────────────────┘
                    │
┌─────────────────────────────────────────┐
│  STORE STATE INFORMATION REPRESENTING INFORMATION │
│  TO TRANSITION THE WEB RESOURCE FROM THE FIRST    │
│  STATE TO THE SECOND STATE BY THE APPLICATION     │
│  PROGRAM                                          │
│                  408                              │
└─────────────────────────────────────────┘
                    │
┌─────────────────────────────────────────┐
│  SEND A SECOND REQUEST FROM THE APPLICATION       │
│  PROGRAM TO THE WEB SERVICE TO MODIFY THE WEB     │
│  RESOURCE FROM THE FIRST STATE TO THE SECOND STATE│
│  USING THE STATE INFORMATION                      │
│                  410                              │
└─────────────────────────────────────────┘
```

ESTABLISH A CONNECTION BETWEEN A CLIENT DEVICE AND A SERVER DEVICE FOR A FIRST COMMUNICATION SESSION, THE SERVER DEVICE TO STORE A NETWORK RESOURCE
502

PRESENT THE NETWORK RESOURCE IN A FIRST STATE AT THE CLIENT DEVICE
504

RECEIVE A FIRST CONTROL DIRECTIVE TO MODIFY THE NETWORK RESOURCE FROM THE FIRST STATE TO A SECOND STATE AT A THE CLIENT DEVICE
506

SEND THE FIRST CONTROL DIRECTIVE TO THE SERVER DEVICE OVER THE CONNECTION
508

RECEIVE THE NETWORK RESOURCE IN THE SECOND STATE FROM THE SERVER DEVICE
510

STORE STATE INFORMATION REPRESENTING INFORMATION TO TRANSITION THE NETWORK RESOURCE FROM THE FIRST STATE TO THE SECOND STATE
512

TERMINATE THE FIRST COMMUNICATION SESSION
514

ESTABLISH A CONNECTION BETWEEN A CLIENT DEVICE AND A SERVER DEVICE FOR A SECOND COMMUNICATION SESSION
602

RECEIVE A SECOND CONTROL DIRECTIVE TO RETRIEVE THE NETWORK RESOURCE FROM THE SERVER DEVICE AT THE CLIENT DEVICE DURING THE SECOND COMMUNICATION SESSION
604

RETRIEVE STATE INFORMATION REPRESENTING INFORMATION TO TRANSITION THE NETWORK RESOURCE FROM THE FIRST STATE TO THE SECOND STATE DURING THE SECOND COMMUNICATION SESSION
606

SEND A THIRD CONTROL DIRECTIVE WITH STATE INFORMATION FOR THE NETWORK RESOURCE TO THE SERVER DEVICE OVER THE CONNECTION DURING THE SECOND COMMUNICATION SESSION
608

RECEIVE THE NETWORK RESOURCE IN THE SECOND STATE FROM THE SERVER DEVICE DURING THE SECOND COMMUNICATION SESSION
610

*FIG. 6*

TECHNIQUES TO MANAGE STATE INFORMATION FOR A WEB SERVICE

RELATED APPLICATION

This application is a continuation of, claims the benefit of and priority to previously filed U.S. patent application Ser. No. 14/101,201 filed Dec. 9, 2013, entitled "TECHNIQUES TO MANAGE STATE INFORMATION FOR A WEB SERVICE", which is a continuation of, claims the benefit of and priority to previously filed U.S. Provisional Patent Application 61/846,250 filed on Jul. 15, 2013, which are hereby incorporated by reference in their entireties.

BACKGROUND

The evolution of economical computing power, near infinite storage capacity, and high-bandwidth communication channels has spurred a migration to network services, sometimes referred to as "cloud-based" services. A web service is an example of a cloud-based storage. A web service is a software function accessible at a network address via a network, such as the World Wide Web (WWW). A service requester may access a web service by sending a request for a web resource to a web service provider over a network. In many cases, the web service is designed for "stateless" operations using a stateless communications protocol, such as a representational sate transfer (REST) protocol, among others. An advantage of stateless design is that it simplifies server design because there is no need to manage and store state information at the server. A disadvantage of stateless design is that changes to web service web resources may be lost once a given communication session terminates.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage state information for service provided by a network. Some embodiments are particularly directed to techniques to manage state information for a web service by storing state information of a web resource provided by a web service at a client device.

In one embodiment, for example, an apparatus may comprise a processor circuit, and an application program for execution by the processor circuit to provide a set of operations to modify a state of a web resource. The application program may include a state manager component arranged to monitor and collect state information for the web resource provided by a network service, such as a web service, as state changes occur to the web resource during a first communication session. The state manager component may store a web resource identifier and associated state information for the web resource in a state database for future use.

The state manager component may subsequently detect access to a web resource during a second communication session, and retrieve a web resource identifier for the accessed web resource. The state manager component may search the state database for a web resource that matches the web resource identifier for the accessed web resource, and retrieve the previously stored state information associated with the accessed web resource from the state database. The application program may send the state information to the network service, which may modify the web resource according to the received state information, and return a modified web resource in substantially a same state as when the first communication session was terminated. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates an embodiment of a first logic flow for the apparatus.

FIG. 5 illustrates an embodiment of a second logic flow for the apparatus.

FIG. 6 illustrates an embodiment of a third logic flow for the apparatus.

DETAILED DESCRIPTION

Figure 1:
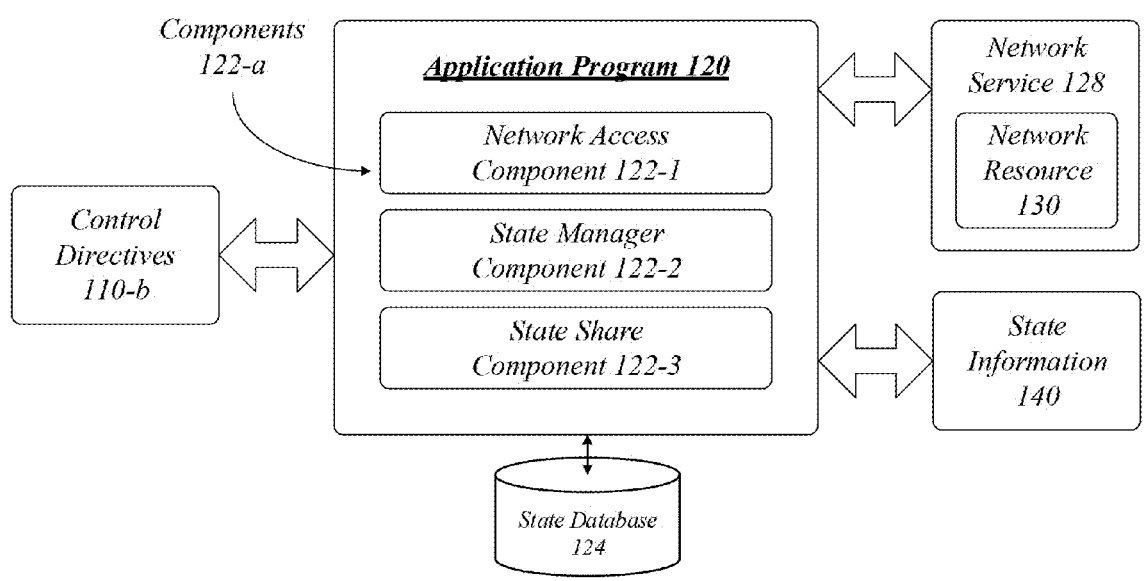
FIG. 1 illustrates an embodiment of an apparatus to manage state information.

Various embodiments are generally directed to techniques to manage state information for service provided by a network. This may be particularly useful for network-based services that utilize a stateless design, such as a web service, for example. Although embodiments are described with reference to web services and web resources by way of example, it may be appreciated that the embodiments may be implemented with any type of network service or network resources. Embodiments are not limited in this context.

When interacting with content through a web control (e.g., a web service), a native application is typically unaware of a current state of content. As a result the native application cannot show relevant content or indicators that are within the application but outside of the web control. Embodiments allow the application to react to content being rendered in the web control. Subsequently when the application reacts to web control rendered content, it is able to capture those actions, state of the application and state of the web service. This captured state allows the application to return to a prior state (error recovery, or state of web service, e.g. sort and filter states) without involving any server side persistence.

In addition to interaction, users now like to share, publish, or return to the state of the content they are viewing. Previously, a method of sharing was done by taking a screenshot and simply sharing an image. Embodiments allow users to share the state of their content with other users and allow other native applications to immerse the receiving user in the same experience.

In exemplary operation, a user may view content within client software, such as a web control, for example. A user may interact with a web service, where the web control is embedded within a native application. The user may change the state of the web control view by some mode of interaction utilizing any human interface device. Alternatively, commands can be received from an application, machine-to-machine interaction or other automated source. The application captures and saves the state of this interaction locally after a successful call is issued and response received. The application changes the state of natively rendered UI if desired. When the user wants to share the exact state of the application and content, they can do so by share functionality within the application. The user receiving the shared content is able to open the application and enter the shared state, due to state information being transferred as part of the share action. If the user was to navigate away from the web control and return, the application could enter the last seen state (e.g., native and web control content). When the application crashes, graceful recovery allows the application to return to the last seen state (e.g., native and web control content). In all of these cases, no state data needs to be saved by the web service even though web content is being rendered. The application stores this state locally or in a remote storage device.

More particularly, embodiments may store state information at a client device for a web resource provided by a web service. More particularly, an application program executing on the client device may store and manage the state information. In one embodiment, the application program may comprise a productivity application program. In another embodiment, the application program may comprise any non-browser based application program.

The stored state information may represent a state of the web resource at termination of a first communication session. The stored state information may be used to return the web resource to a same or similar state during a second communication session. For instance, the stored stated information may be conveyed to a web service managing the web resource via a stateless protocol, such as the Internet Protocol (IP), Hypertext Transfer Protocol (HTTP), REST protocol, and so forth. In another example, the stored state information may be conveyed to the web service using a combination of stateful and stateless protocols implemented among different protocol layers. Examples of stateful protocols may include the Transmission Control Protocol (TCP) and Border Gateway BC Protocol (BGP), among others.

In various embodiments, the stored state information may be shared for use by any combination of users, client devices, or application programs. In one embodiment, for example, the stored state information may be used by a single application program executing on a single client device. In one embodiment, for example, the stored state information may be used by different client devices of a single user. In one embodiment, for example, the stored state information may be used by different application programs executing on a single client device. In one embodiment, for example, the stored state information may be used by different versions of a same application program executing on different client devices. Many sharing permutations are possible, and the embodiments are not limited in this context.

Selective capture of state information provides many advantages and use scenarios. For instance, by capturing the state of the application and web service interaction, the native application is able to update and show relevant user interface (UI) views based on commands issued by interacting with the web service via a web control. The native application is also able to store this state information, which enables sharing scenarios and recovery from application crashes. Embodiments also allow integration of the user experience between a native application and a web server. Embodiments further allow the native application to know the state of the web service and the content being viewed in the web control. Embodiments allow capture and storage of state information for the application and web service locally. Embodiments show relevant content within the application based on the content shown in the web control. Embodiments allow the native application to render content to a prior state. Embodiments allow users to share an immersive content experience with other users or devices. Embodiments allow the native application to gracefully recover from faults or crashes. Other advantages and use scenarios exist as well.

As a result, the embodiments can improve affordability, scalability, modularity, extendibility, or interoperability for an operator, device or network. Other advantages and use scenarios apply as well.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an apparatus 100. In one embodiment, the apparatus 100 may comprise a computer-implemented apparatus 100 having a software application program 120 comprising one or more components 122-a. Although the apparatus 100 shown in FIG. 1 has a limited number of elements in a certain topology, it may be appreciated that the apparatus 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

As described in more detail below, the apparatus 100 may generally comprise an application program 120 arranged to provide a set of operations to modify a state of a network resource 130 provided by a network service 128. The application program 120 may comprise, among other elements, a state manager component 122-2 arranged to record state information 140 for the network resource 130 provided by the network service 128 as state changes occur to the network resource 130 during a first communication session. The state manager component 122-2 may store a resource identifier and associated state information 140 for the network resource 130 in a state database 124. The state information 140 may be used by the application program 120, or another application program, in automatically reproducing a state of the network resource 130 during a second communication session. Other embodiments are described and claimed.

The apparatus 100 may comprise the application program 120. The application program 120 may be generally arranged to access a network resource 130. A network resource 130 may comprise any addressable set of electronic data. In one embodiment, for example, a network resource 130 may comprise a web resource. A web resource is generally a primitive in a web architecture to define its fundamental elements, and may include any target of a uniform web resource locator (URL), a uniform web resource identifier (URI), a referent of a URL or URI, an internationalized web resource identifier (IRI), and so forth. In one embodiment, a network resource 130 may comprise abstract resources and semantic properties as described using a particular language, such as a resource description framework (RDF) language, among others.

In one embodiment, the network resource 130 may comprise content of an application program hosted by a network server. For example, a network resource 130 may comprise an electronic file for an application program. An electronic file is a data structure that stores a set of information in a persistent and organized manner. Different applications typically utilize different file formats. For instance, a word processing application may store a document in a word processing format, a spreadsheet application may store a document in a spreadsheet format, and so forth. In some instances, a file format and content for an electronic file remains static unless manually modified by a user. In other instances, a file format and content for an electronic file can be automatically refreshed or modified while stored on servers, without any user intervention at all.

In one embodiment, the network resource 130 may be provided by a same electronic device implementing the apparatus 100. In one embodiment, the network resource 130 may be provided by a different electronic device (e.g., a server) from the one implementing the apparatus 100 (e.g., a client). In such an embodiment, the network resource 130 may be provided by a network service 128, such as a web service, for example. In general, the network service 128 may comprise a service to provide access to the network resource 130 over a network connection. Network service 128 in general, and a web service in particular, may be described in more detail below.

The application program 120 may comprise any software application capable of creating, modifying, managing or otherwise using a network resource 130. In one embodiment, the application program 120 may comprise or be implemented as a productivity application. A productivity application may comprise a software application program designed to perform a specific set of functions for a knowledge worker. A productivity application typically operates to create, modify, send, receive, or otherwise manage content for one or more documents. Examples for productivity applications may include without limitation a productivity suite of inter-related client applications, server applications and/or web services, designed for a particular operating system, such as a MICROSOFT® OFFICE productivity suite for MICROSOFT WINDOWS®, made by Microsoft Corporation, Redmond, Wash. Examples for productivity applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Examples for server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. It also is to be appreciated that embodiments may implement other types of applications in addition to productivity applications which are consistent with the described embodiments. The embodiments are not limited to these examples.

The application program 120 may be capable of communicating with a network device, such as a server providing network services, such as a web service. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, MICROSOFT OFFICE 365, and MICROSOFT OFFICE 365 POWER BI, among others.

Application program 120 and the web service may be implemented in any number of different ways. By way of example, assume the application program 120 comprises a report generator and a network service 128 comprises a MICROSOFT EXCEL web service that provides spreadsheet files and operations. The report generator may access the MICROSOFT EXCEL web service to generate a dynamic chart or table to embed in a report. Every time the report is opened by a user by the application program 120, a call is made to retrieve the chart or table from the MICROSOFT EXCEL web service. This is merely one example, and other use scenarios may apply.

The application program 120 may comprise a network access component 122-1. The network access component 122-1 may be generally arranged to provide access and control of a network resource 130 implemented as part of a network architecture, such as a web architecture, for example. The network access component 122-1 may communicate with the network service 128, access the network resource 130 via the network service 128, and send one or more control directives 110 to modify a state for the network resource 130 to the network service 128.

The network access component 122-1 may allow the application program 120 to access various web services within the context of the application program 120. The network access component 122-1 may implement an interface suitable for accessing a web service as implemented by a network device, such as a network server or web server. The network access component 122-1 may implement a set of web application program interfaces (APIs) suitable for interfacing and interoperating with the web service. In one embodiment, for example, the network access component 122-1 may implement an interface compatible with a set of REST APIs for REST based communications, capable of communicating Extensible Markup Language (XML) messages via the Simple Object Access Protocol (SOAP), interpret an XML-based interface description language such as Web Services Description Language (WSDL), and so forth. These are merely a few examples, and any suitable network interfaces may be implemented.

The network access component 122-1 may be used to access and modify a network resource 130 in response to one or more control directives 110-b. The control directives 110 may represent user commands entered via an input device to an electronic device executing the apparatus 100. The network access component 122-1 may receive a control directive 110, and initiate a communication session by sending a request for a network resource 130 from a web service in response to the control directive 110. The request may be sent using any number of communications protocols, including stateless protocols, stateful protocols, or some combination of both. In one embodiment, for instance, the network access component 122-1 may send the request utilizing a combination of REST and SOAP protocols.

The control directive 110 may represent instructions to modify the network resource 130 in some manner to change its current state. For instance, consistent with our previous example, assume the network resource 130 is a spreadsheet document having a set of columns and rows in a defined configuration, which may be referred to as a first state. The control directive 110 may include a command to sort the rows of the spreadsheet document in a different order, which may be referred to as a second state. The network access component 122-1 may send the sort command to the web service. The web service may sort the spreadsheet document in accordance with the sort command, and return the spreadsheet document in the sorted order. In another example, the control directive 110 may include a command to filter certain information from the rows and/or columns. The control directives 110 may represent any commands allowed by the application program 120 and/or the web service managing the network resource 130.

In a stateless architecture, any modifications made to a network resource 130 in response to control directives 110 may be lost once a communication session and/or the application program 120 terminates. In the previous example, any modifications made to the spreadsheet document (e.g., first state to second state) would be lost as state information is not stored by the web service.

The application program 120 may comprise a state manager component 122-2. The state manager component 122-2 may be generally arranged to monitor and capture state information 140 for a network resource 130. This may preserve any modifications made to the network resource 130, without adding storage and management overhead to the web service and underlying server platform. The state information 140 may be stored in a state database 124 with a defined data schema suitable for retrieval by the application program 120 and/or the web service. The state information 140 may include information fields for such information as a web service identifier, a web service address (e.g., URL) and other addressing information, a server identifier, a web resource identifier, control directives, configuration information, profile information, user identifier, application identifier, and any other information suitable for reproducing a given state of a network resource 130. The state database 124 may be stored in a local device executing the apparatus 100, in a remote device in communication with the local device executing the apparatus 100, in both a local and remote device, in multiple local devices, or in multiple remote devices. When shared between local and/or remote devices, synchronization techniques may be used to keep state information 140 synchronized between devices. An example of a remote device may include a network storage server, among other types of devices.

The state manager component 122-2 may surface one or more user interface (UI) elements to give a user an option to record state information 140 for a network resource 130. When activated, the state manager component 122-2 may monitor the communications stream for information such as control directives 110, requests to the web service, responses from the web service, and the network resource 130. The state manager component 122-2 may then capture and format selective portions of the information in accordance with a given data schema used to store the state information 140. For instance, the state manager component 122-2 may just monitor for control directives 110 and utilize the control directives to form state information 140. In another example, the state manager component 122-2 may wait until a web service responds to a request in case the request was denied or failed.

In some cases, the state manager component 122-2 may also monitor a state of the application program 120, and use the state information for the application program 120 as context for reproducing a state of a network resource 130 rendered by the application program 120.

The state manager component 122-2 may capture state information 140 on a continuous, periodic, aperiodic, or on-demand basis. The capture interval may be a configurable parameter as desired by a given user, application program 120, web service, network resource 130, communication session, and so forth.

Once state information 140 for a given network resource 130 is stored in the state database 124, the state manager component 122-2 may use the state information 140 to reproduce a given state of the network resource 130 during a future communication session and/or instantiation of the application program 120. In one embodiment, for example, the state manager component 122-2 may reproduce a state of the network resource 130 by resending a same sequence of control directives 110 used to create the state of the network resource 130 during a previous communication session and/or instantiation of the application program 120. Other techniques for conveying state information in stateless protocol may be used as well. Embodiments are not limited in this context.

The application program 120 may comprise a state share component 122-3. The state share component 122-3 may be generally arranged to share state information 140 with other application programs, devices, systems, and/or users. This may allow other application programs, devices, systems and/or users to reproduce a given state of a network resource 130.

Figure 2:
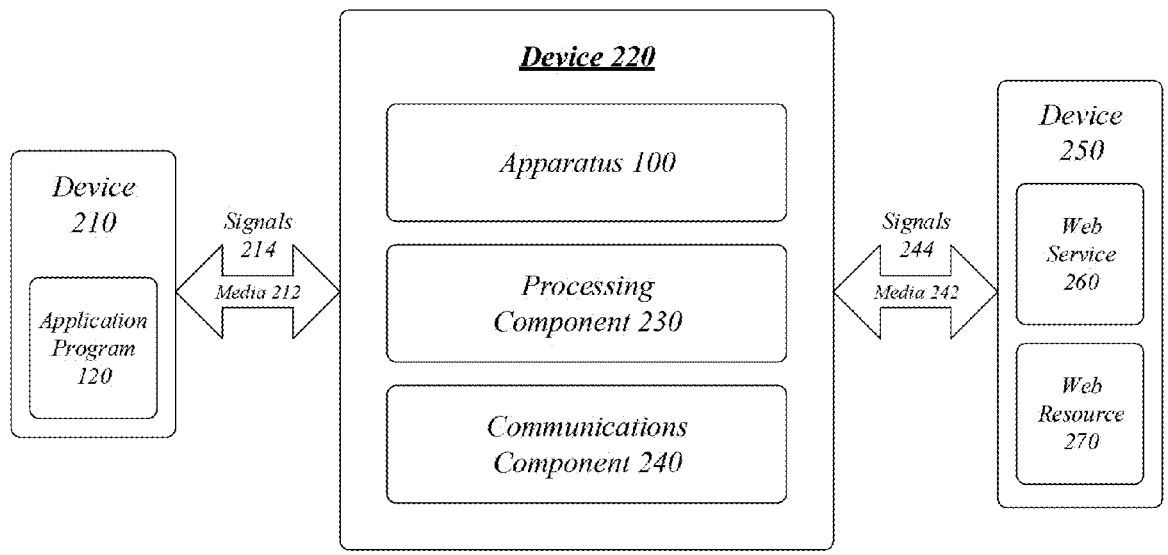
FIG. 2 illustrates an embodiment of a centralized system for the apparatus.

FIG. 2 illustrates a block diagram of a centralized system 200. The centralized system 200 may implement some or all of the structure and/or operations for the apparatus 100 in a single computing entity, such as entirely within a single device 220.

The device 220 may comprise any electronic device capable of receiving, processing, and sending information for the apparatus 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 220 may execute processing operations or logic for the apparatus 100 using a processing component 230. The processing component 230 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory web resources, data bus speeds and other design or performance constraints, as desired for a given implementation.

The device 220 may execute communications operations or logic for the apparatus 100 using communications component 240. The communications component 240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 240 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 212, 242 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 220 may communicate with other devices 210, 250 over a communications media 212, 242, respectively, using communications signals 214, 244, respectively, via the communications component 240. The devices 210, 250 may be internal or external to the device 220 as desired for a given implementation.

As shown in FIG. 2, the device 220 may implement the entire apparatus 100 to access a web service implemented by another device, such as a web service 260 implemented by the device 250. The apparatus 100 may also share state information 140 with another device implementing some or all of apparatus 100, such as the device 210. State information 140 may be shared in any number of ways, such as through a messaging interface (e.g., email, short message service (SMS), multimedia message service (MMS), instant messaging (IM), and so forth), shared network storage space, peer-to-peer communications, and other communications modalities. The device 210 may then use apparatus 100 to communicate with the web service 260 in a manner similar to the device 220. The device 220 may further implement other platform components common to a computing and/or communications device, such as described with reference to FIG. 7.

Figure 3:
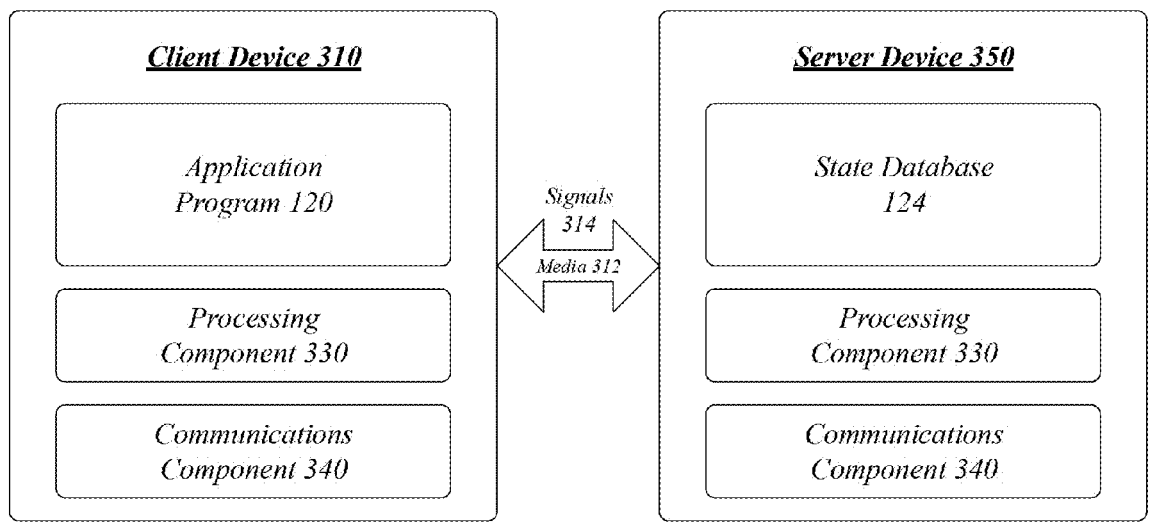
FIG. 3 illustrates an embodiment of a distributed system for the apparatus.

FIG. 3 illustrates a block diagram of a distributed system 300. The distributed system 300 may distribute portions of the structure and/or operations for the apparatus 100 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 300 may comprise a client device 310 and a server device 350. In general, the client device 310 and the server device 350 may be the same or similar to the client device 220 as described with reference to FIG. 2. For instance, the client system 310 and the server system 350 may each comprise a processing component 330 and a communications component 340 which are the same or similar to the processing component 230 and the communications component 240, respectively, as described with reference to FIG. 2. In another example, the devices 310, 350 may communicate over a communications media 312 using communications signals 314 via the communications components 340.

The client device 310 may comprise or employ one or more client programs that operate to perform various methodologies in accordance with the described embodiments. In one embodiment, for example, the client device 310 may implement a portion of the apparatus 100, such as the application program 120, for example.

The server device 350 may comprise or employ one or more server programs that operate to perform various methodologies in accordance with the described embodiments. In one embodiment, for example, the server device 350 may implement a portion of the apparatus 100, such as the state database 124, for example. The distributed model may be suitable for sharing state information 140 among multiple devices or users.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 4 illustrates one embodiment of a logic flow 400. The logic flow 400 may be representative of some or all of the operations executed by one or more embodiments described herein. For instance, the logic flow 400 may be executed by the apparatus 100.

In the illustrated embodiment shown in FIG. 4, the logic flow 400 may receive a control directive to modify a web resource provided by a web service at block 402. For example, the network access component 122-1 of the application program 120 may receive a control directive 110 to modify a network resource 130 provided by a web service 260. The control directive 110 may originate from an input device controlled by a human user.

The logic flow 400 may send a first request from an application program to the web service to modify the web resource from a first state to a second state at block 404. For example, the network access component 122-1 may send a first request from an application program 120 to the web service 260 to modify the network resource 130 from a first state to a second state. The first request may be sent using a combination of REST and SOAP protocols.

The logic flow 400 may receive a response from the web service with the web resource in the second state at block 406. For example, the web service 260 may receive the first request to modify the network resource 130, and modify the network resource 130 in accordance with the instructions provided with the first request. The web service 260 may send a response with the modified network resource 130 to the application program 120. The network access component 122-1 may receive the response from the web service 260 with the network resource 130 in the second state, and render the modified network resource 130 utilizing a UI and display implemented with the receiving device.

The logic flow 400 may store state information representing information to transition the web resource from the first state to the second state by the application program at block 408. For example, the state manager component 122-2 may monitor and store state information 140 representing information needed to modify or transition the network resource 130 from the first state to the second state by the application program 120. This may occur in a new session, instantiation of the application program 120, a different version of the application program 120 (e.g., executing on a different device), a different application program from the application program 120, and other scenarios. The state manager component 122-2 may store the state information 140 in a state database 124 implemented in a same device (e.g., device 220) or different device (e.g., server device 350) as the application program 120.

The logic flow 400 may send a second request from the application program to the web service to modify the web resource from the first state to the second state using the state information at block 410. For instance, sometime after the state information 140 is stored and the rendered modified network resource 130 is no longer available to the application program 120 (e.g., a terminated session, a terminated program, communication errors, device failure, etc.), the web control 122-1 may send a second request from the application program 120 to the web service 260 to modify the network resource 130 from the first state to the second state using the state information 140 stored in the state database 124.

FIG. 5 illustrates one embodiment of a logic flow 500. The logic flow 500 may be representative of some or all of the operations executed by one or more embodiments described herein. For instance, the logic flow 500 may be executed by the apparatus 100 to generate state information 140 for a network resource 130.

In the illustrated embodiment shown in FIG. 5, the logic flow 500 may establish a connection between a client device and a server device for a first communication session, the server device to store a network resource at block 502. For instance, the device 220 may establish a connection with device 250 via media 242 and signals 244 for a first communication session utilizing the communications component 240. The device 250 may store a network resource, such as web resource 270. The web resource 270 may be managed and/or accessed via a network service, such as a web service 260.

The logic flow 500 may present the network resource in a first state at the client device at block 504. For instance, in response to a user command via a human input device (e.g., a gesture on a touch screen, a pointing device such as a mouse, voice commands, eye movement commands, etc.), the application program 120 may utilize the network access component 122-1, such as an embedded web control, to request the web resource 270 from the web service 260. The web service 260 may access and deliver the web resource 270 to the device 220 utilizing one or more communications protocols. The application program 120 may present the web resource 270 in a first state on an electronic display (e.g., a touch screen) at the device 220. An example for the web resource 270 may be a table comprising rows and columns. An example for the first state of the web resource 270 may be data in the rows and columns arranged in a first sorted order.

The logic flow 500 may receive a first control directive to modify the network resource from the first state to a second state at the client device at block 506. For instance, the network access component 122-1 may receive a first control directive 110-1 from the human input device to modify the web resource 270 from the first state to a second state at the device 220. An example for the first control directive 110-1 may be a sort command to sort data in the rows and columns according to a second sorted order.

The logic flow 500 may send the first control directive to the server device over the connection at block 508. For instance, the network access component 122-1 may send the first control directive 110-1 over media 242 via signals 244 to the device 250 utilizing the communications component 240.

The logic flow 500 may receive the network resource in the second state from the server device at block 510. For instance, the web service 260 may receive the first control directive 110-1, and modify the web resource 270 accordingly to form the second state. The web service 260 may then send the web resource 270 to the device 220 over media 242 via signals 244 utilizing a similar communications component 240. The network access component 122-1 may receive the web resource 270 in the second state from the device 250. The application program 120 may present the web resource 270 in the second state on the electronic display at the device 220. An example for the second state of the web resource 270 may be data in the rows and columns arranged in the second sorted order.

The logic flow 500 may store state information representing information to transition the network resource from the first state to the second state at block 512. For instance, the state manager component 122-2 may monitor and capture one or more of the control directives 110 used to modify the web resource 270 from the first state to the second state, and store the captured control directives 110-b as state information 140.

The state manager component 122-2 may assign a state information identifier to the state information 140. A state information identifier may be composed of any information that uniquely identifies the state information 140. The state information identifier for the state information 140 may comprise a same or different identifier used for the web resource 270.

The state manager component 122-2 may retrieve and/or generate a resource identifier for the web resource 270. A resource identifier for the web resource 270 may comprise any information that uniquely identifies the web resource 270. The state manager component 122-2 may utilize a resource identification algorithm to retrieve information about a particular web resource 270. The state manager component 122-2 may retrieve the information from the control directive 110-1 itself, the web service 260, the web resource 270, a web resource database, or some other source. The information may comprise such information as a file name and/or a file name extension, one or more search terms, a search request, a link, a uniform resource locator (URL), a uniform resource identifier (URI), content, metadata, a web service, device information, connection information, and so forth. The resource identification algorithm may then utilize a set of rules to construct an identifier for the web resource 270 utilizing the retrieved information.

In some cases, the identifier may comprise a single piece of information that is sufficiently unique for resource identification purposes. For instance, the resource identification algorithm may generate a resource identifier from a URL to the web resource 270, a filename for the web resource 270, a globally unique identifier (GUID) for the web resource 270, and so forth.

In other cases, the identifier may comprise a combination of different pieces of information to create sufficient uniqueness for resource identification purposes. For instance, when a file name is a common file name, the resource identification algorithm may generate a resource identifier by adding additional pieces of gathered information to the file name to make it more unique, such as combining the filename with a web service name that provides the filename.

Once the state information identifier and the resource identifier are generated, the state manager component 122-2 may then associate the identifiers, and store the associated identifiers as part of the state information 140 in the state database 124. It may be appreciated that the state database may be implemented locally as part of the device 220, or remotely as part of another device (e.g., server device 350). The state information 140 may then be used to transition the web resource 270 from the first state to the second state at some future point in time, such as a second communication session for the device 220, a first communication session for another device having access to the state information 140, and so forth.

The logic flow 500 may terminate the first communication session at block 514. For instance, once a user is finished modifying the web resource 270, the user may send another control directive 110 to terminate the connection between the devices 220, 250.

FIG. 6 illustrates one embodiment of a logic flow 600. The logic flow 600 may be representative of some or all of the operations executed by one or more embodiments described herein. For instance, the logic flow 600 may be executed by the apparatus 100 to utilize state information 140 for a network resource 130.

In the illustrated embodiment shown in FIG. 6, the logic flow 600 may establish a connection between a client device and a server device for a second communication session at block 602. For instance, the device 220 may establish another connection with device 250 via media 242 and signals 244 for a second communication session utilizing the communications component 240. In one embodiment, the second communication session may occur in a point in time after the first communication session once the first communication session is terminated (e.g., block 514). In one embodiment, the second communication session may occur simultaneously with the first communication session, such as when a different application program other than application program 120 (or a different instantiation of the application program 120) establishes a connection with the web service 260 to access the same web resource 270 in the first state. Embodiments are not limited in this context.

The logic flow 600 may receive a second control directive to retrieve the network resource from the server device at the client device during a second communication session at block 604. For instance, in response to a user command via a human input device (e.g., a gesture on a touch screen, a pointing device such as a mouse, voice commands, eye movement commands, etc.), the application program 120 may receive a second control directive 110-2 to utilize the network access component 122-1, such as an embedded web control, to request the web resource 270 from the web service 260.

The logic flow 600 may retrieve state information representing information to transition the network resource from the first state to the second state during a second communication session at block 606. As previously described with respect to the logic flow 500, the state manager component 122-2 may store state information 140 representing information to transition the web resource 270 from the first state to the second state in the state database 124. When the network access component 122-1 receives the second control directive 110-1, it may inform the state manager component 122-2. The state manager component 122-2 may retrieve and/or generate a resource identifier for the web resource 270 utilizing the same or similar logic of the resource identification algorithm as described with reference to logic flow 500. The state manager component 122-2 may then utilize the resource identifier to search for state information 140 corresponding to the web resource 270.

The logic flow 600 may send a third control directive with state information for the network resource to the server device over the connection during a second communication session at block 608. For instance, the network access component 122-1 may receive the state information 140 for the web resource 270, and combine it with the second control directive 110-2, to form a third control directive 110-3. The network access component 122-1 may then send the third control directive 110-3 to the device 250 over the media 242 via the signals 244 utilizing the communications component 240.

The logic flow 600 may receive the network resource in the second state from the server device during a second communication session at block 610. For instance, the web service 260 may receive the third control directive 110-3. The web service 260 may access the web resource 270, modify the web resource 270 from the first state to the second state, and deliver the web resource 270 in the second state to the device 220 utilizing one or more communications protocols. The application program 120 may present the web resource 270 in a second state on an electronic display (e.g., a touch screen) at the device 220. An example for the second state of the web resource 270 may be data in the rows and columns arranged in a second sorted order.

Figure 7:
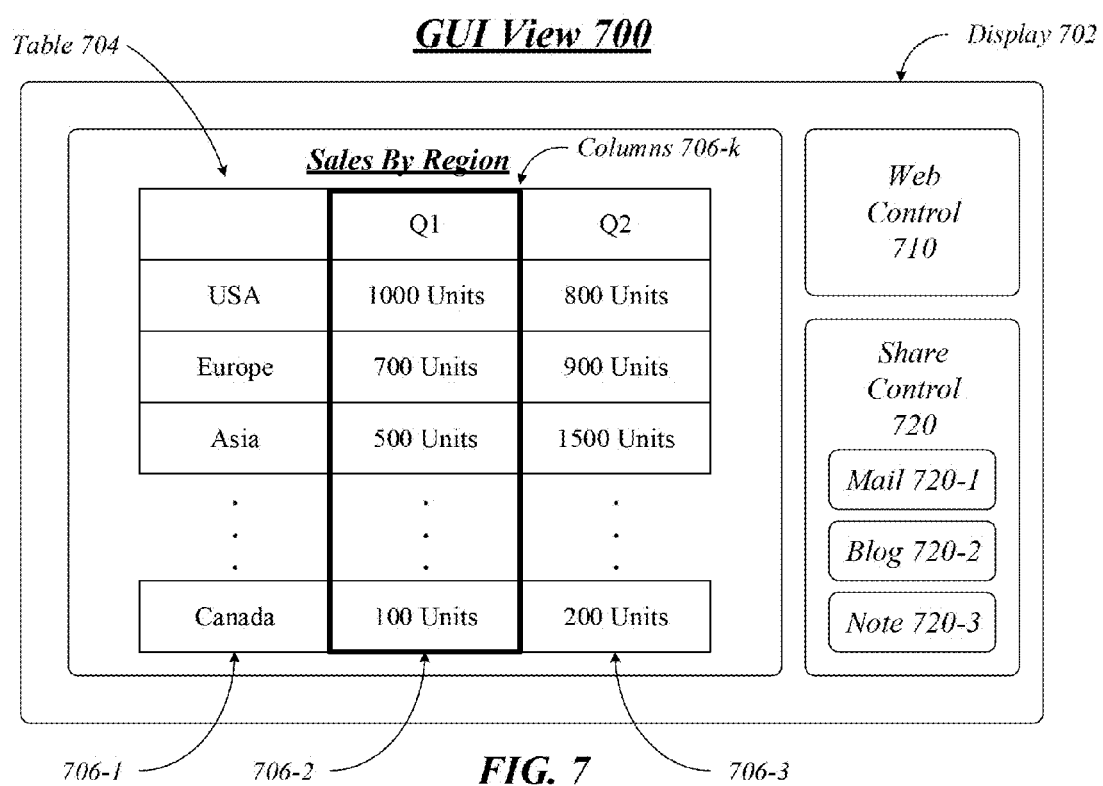
FIG. 7 illustrates an embodiment of a first graphical user interface (GUI) view.

FIG. 7 illustrates an exemplary first graphical user interface (GUI) view 700. The GUI view 700 provides an example of a web resource 270 in a first state as stored by a web service 260 and presented on an electronic display at a client device.

As shown in FIG. 7, the GUI view 700 may illustrate a web resource 270 as presented by a user interface of the application program 120 on a display 702 of a device 220. The web resource 270 may comprise an instantiation of a table 704 having a set of columns 706-$k$, which in this case includes columns 706-1, 706-2 and 706-3. The table 704 may comprise part of a report titled "Sales By Region," and may optionally include quarterly sales data of product units in various countries.

The web resource 270 may be provided by a web service 260, which in this example may comprise a MICROSOFT OFFICE 365 POWER BI web service implemented on the device 250. The GUI view 700 may further comprise a web control 710 which may be used to request the table 704 from the web service 260. The GUI view still further comprises a share control 720. The share control 720 may provide various options for a user to share the table 704 with other users and devices.

The GUI view 700 illustrates the table 704 in a first state. In the first state, the table 704 is sorted by column 706-2 corresponding to "Q1" sales data. As shown in the first state, the sort order of Q1 sales data is from highest to lowest, starting with 1000 Units in the USA, 700 Units in Europe, 500 Units in Asia, and finally 100 Units in Canada.

Figure 8:
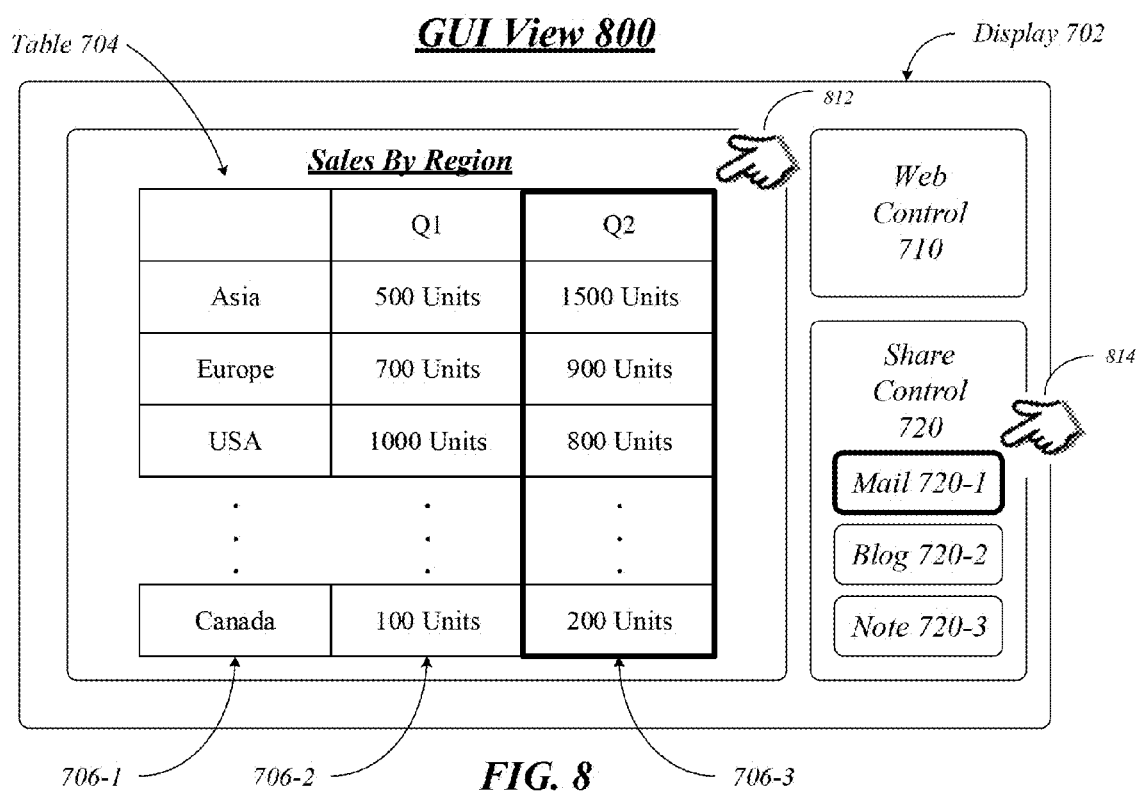
FIG. 8 illustrates an embodiment of a second GUI view.

FIG. 8 illustrates an exemplary second GUI view 800. The GUI view 800 provides an example of the web resource 270 in a second state as modified by the application program 120 and presented on an electronic display at a client device.

Continuing with the previous example introduced in FIG. 7, assume a user issues utilizes a gesture 812 on a touch screen surface of the display 702 to sort the table 704 by the column 706-3 which presents "Q2" sales data. The touch screen surface may convert the gesture 812 into a control directive 110-1 comprising a sort command. The web control 710 may send the control directive 110-1 to the web service 260, which may modify the table 704 to conform to a second state where the table 704 is sorted by Q2 sales data. In this example, the Q2 sales data may include 1500 Units in Asia, 900 Units in Europe, 800 Units in USA, and finally 200 Units in Canada. The device 220 may then present the table 704 in the second state on the display 702.

At this point, assume a user utilizes a gesture 814 to activate a mail control 720-1 in order to share the table 704 with another device, such as device 210. The touch screen surface may convert the gesture 814 into a control directive 110-2 to share the table 704 in the second state with the device 210 via email. The device 210 may be owned and/or operated by the same user or a different user from the one issuing the control directive 110-2.

Figure 9:
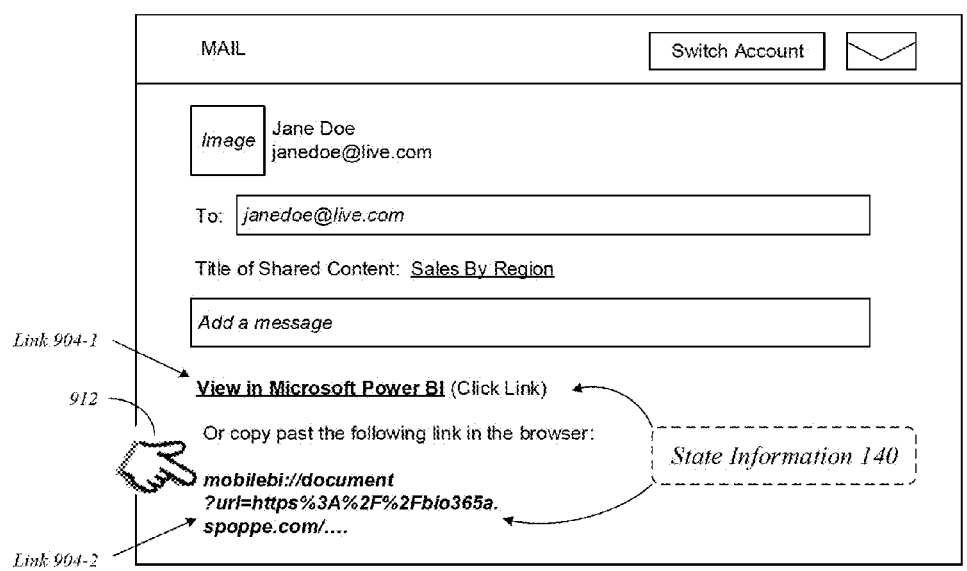
FIG. 9 illustrates an embodiment of a third GUI view.

FIG. 9 illustrates an exemplary third GUI view 900. The GUI view 900 provides an example a mail interface used to share the web resource 270 in a second state between a set of devices.

The GUI view 900 illustrates a mail interface 902 that may be presented by the application program 120 in response to the control directive 110-2 when the mail control 720-1 is activated by the gesture 814. The mail interface 902 may comprise various GUI elements, which includes a field to enter an email address "janedoe@live.com" of a second user named "Jane Doe." The mail interface may further include a set of links 904-1, 904-2. The links 904-1, 904-2 may include state information 140 for the web resource 270. The state information 140 may comprise integrated parts of the links 904-1, 904-2. Alternatively, the state information 140 may comprise a separate file or procedure call associated with each of the links 904-1, 904-2, which may be utilized by the application program 120 when the links 904-1, 904-2 are activated.

Assume the second user receives an email with the links 904-1, 904-2 at the device 210. Further assume the second user activates the link 904-2 via a gesture 912. The application program 120 of the device 210 may issue a control directive 110-3 to the web service 260 storing the table 704. As the web service 260 is a stateless web service, it does not retain any state information for any web resources 270, which in this case includes table 704. Therefore, absent the state information 140, the web service 260 would deliver the table 704 in the first state as shown in GUI view 700. However, as state information 140 is available to the application program 120, the application program 120 of the device 210 may issue the control directive 110-3 with the state information 140 to the web service 260 storing the table 704. The web service 260 may modify the table 704 from the first state to the second state, and deliver the modified table 704 to the device 210. The application program 120 may then present the table 704 in the second state, as shown in GUI view 800, on a display of the device 210.

In some cases, a user may not desire to view the table 704 in the second state, as shown in GUI view 800. In such cases, a user may use a gesture to ignore the second state and return the table 704 to the first state as originally published.

Figure 10:
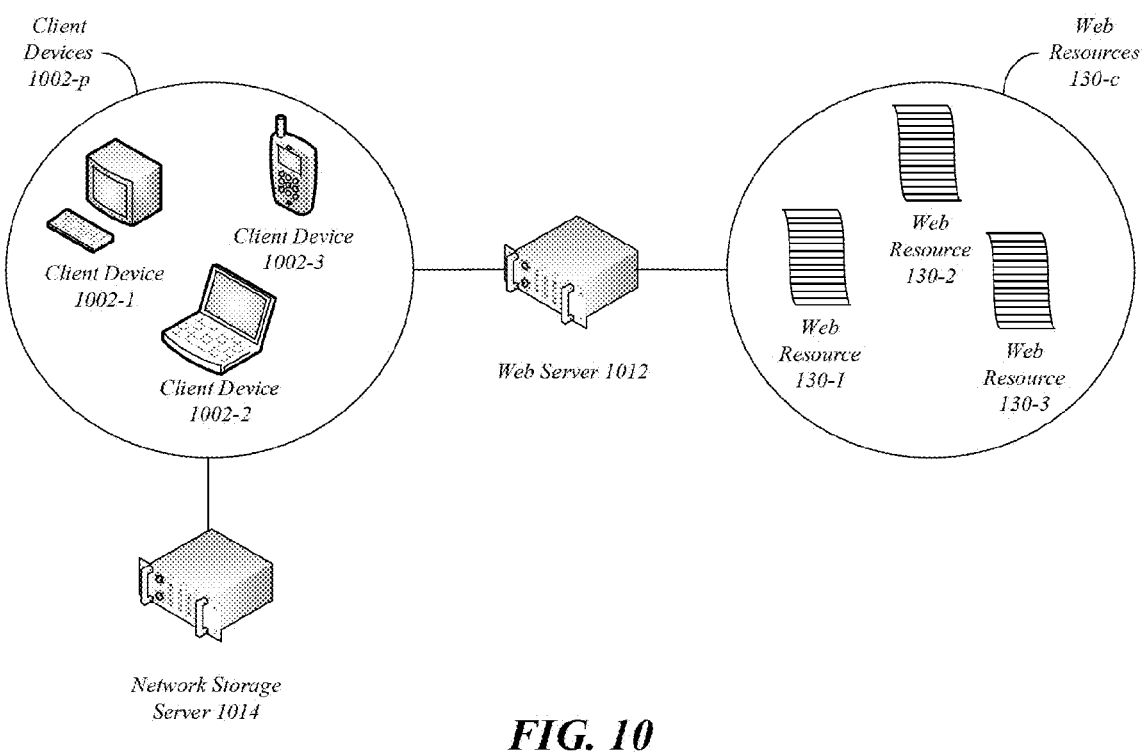
FIG. 10 illustrates an embodiment of a network for the apparatus.

FIG. 10 illustrates a block diagram for a network 1000. The network 1000 may comprise multiple client devices 1002-p. The client devices 1002 may each implement apparatus 100 to interface with a web server 1012. The web server 1012 may implement the web service 260 to access one or more web resources 130.

In operation, a client device 1002-1 may execute the state manager component 122-2 of the application program 120 to monitor and collect state information 140 for a network resource 130-1 provided by the web service 260 implemented by the web server 1012. For instance, state changes may occur to the network resource 130-1 during a first communication session in response to control directives forwarded from an input device controlled by a user to the web server 1012. The state manager component 122-2 may store a web resource identifier and associated state information 140 for the network resource 130-1 in a state database 124 for future use.

The state manager component 122-2 may subsequently detect access to the network resource 130-1 during a second communication session, and retrieve a web resource identifier for the subsequently accessed network resource 130-1. The state manager component 122-2 may search the state database 124 for a network resource 130-1 that matches the web resource identifier for the accessed network resource 130-1, and retrieve previously stored state information 124 associated with the accessed network resource 130-1 from the state database 124. A network access component 122-1 may send the state information 140 to the web service 260 in order to instruct the web service 260 to modify the network resource 130-1 according to the received state information 140, and return a modified network resource 130-1 in substantially a same state as when the first communication session was terminated.

The state manager component 122-2 may store state information 140 in a state database 124. The state database 124 may be implemented in the client device 1002-1, or another client 1002-2 owned by the same owner of the client device 1002-1. Additionally or alternatively, the state database 124 may be implemented as part of a network storage server 1014, such as MICROSOFT LIVE network storage server, for example.

The state share component 122-3 may share the state information 140 for the modified network resource 130-1 with a client device 1002-2 executing a same or similar version of the application program 120. The application program 120 of the client device 1002-2 may utilize the shared state information 140 to reproduce the modified network resource 130-1 in a same or similar state as produced by the application program 120 of the client device 1002-1.

Figure 11:
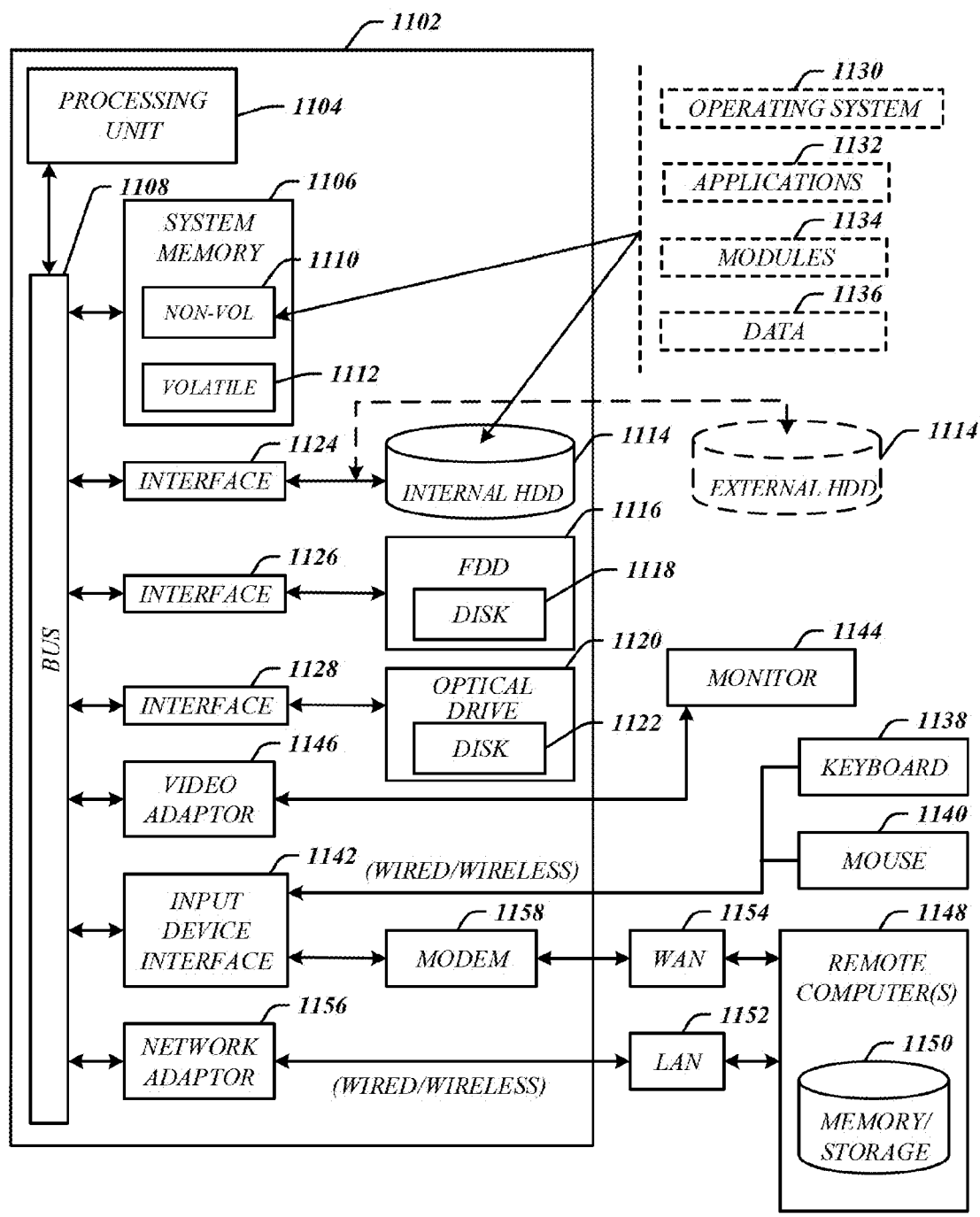
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
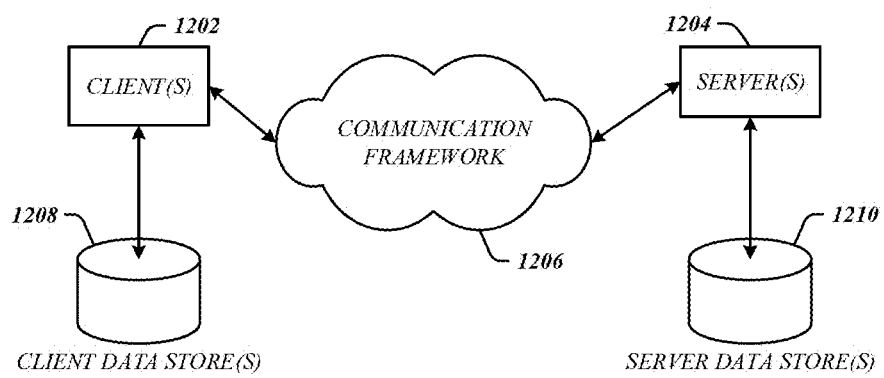
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client devices 220, 310. The servers 1204 may implement the server device 350. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   establishing a connection between a client device and a server device for a communication session, the server device to operate a stateless protocol for communicating a network resource over the connection;
   presenting, in a web control being displayed at the client device, the network resource in a first state at the client device;
   receiving a first control directive to modify the network resource from the first state to a second state at the client device;
   sending the first control directive to the server device over the connection wherein neither the first state nor the second state is recorded at the server device;
   receiving the network resource in the second state from the server device; and
   returning the network resource to the first state using local state information representing information to transition the network resource between the first state and the second state, wherein the server device does not store any state information representing information to transition the network resource between the first state and the second state.

2. The computer-implemented method of claim 1, comprising terminating the communication session.

3. The computer-implemented method of claim 1, comprising establishing a connection between the client device and the server device for a second communication session, the server device to store a network resource.

4. The computer-implemented method of claim 1, comprising receiving a second control directive to retrieve the network resource from the server device at the client device during a second communication session.

5. The computer-implemented method of claim 1, comprising retrieving, at the client device, the state information representing information to transition the network resource from the first state to the second state during a second communication session.

6. The computer-implemented method of claim 1, comprising sending, from the client device, a third control directive with the state information for the network resource to the server device over the connection during a second communication session.

7. The computer-implemented method of claim 1, comprising receiving the network resource in the second state from the server device during a second communication session.

8. An apparatus, comprising:
a processor circuit; and
an application program for execution by the processor circuit to present, in a web control, a network resource provided by a network service and provide a set of operations to modify a state of the network resource, the application program comprising:
a state manager component arranged to record state information for the network resource provided by the network service as state changes occur to the network resource during a first communication session over a stateless protocol, and store a resource identifier and associated state information for the network resource in a state database, the state information for use in automatically reproducing a state of the network resource during a second communication session.

9. The apparatus of claim 8, the network resource comprising content of an application program hosted by a network server.

10. The apparatus of claim 8, the network service comprising a service to provide access to the network resource over a network connection.

11. The apparatus of claim 8, the application program comprising a network access component to communicate with the network service, access the network resource, and send control directives to modify a state for the network resource.

12. The apparatus of claim 8, the state manager component to detect access to the network resource during the second communication session.

13. The apparatus of claim 8, the state manager component to retrieve state information for the network resource from the state database utilizing the resource identifier during the second communication session.

14. The apparatus of claim 8, the state manager component to send state information for the network resource to the network service during the second communication session.

15. The apparatus of claim 8, the state manager component to receive the network resource from the network service during the second communication session, the network resource to comprise a same state as when the first communication session was terminated.

16. The apparatus of claim 8, the application program comprising a state share component to share the state information with another application program.

17. An article of manufacture comprising at least one computer-readable storage medium comprising computer-executable instructions that, when executed, cause a computer to:
present, in a web control being displayed on a display device, a network resource during a first communication session;
receive a control directive to modify a network resource during the first communication session;
send a first request to modify a state of the network resource to a network service wherein the network service does not store any state information representing the modified state;
receive a response with the network resource in the modified state from the network service;
store state information representing the modified state of the network resource; and
terminate the first communication session.

18. The computer-readable storage medium of claim 17, comprising instructions that when executed cause the computer to receive a control directive to retrieve the network resource from the network service during a second communication session.

19. The computer-readable storage medium of claim 17, comprising instructions that when executed cause the computer to return the network resource to the first state using the state information representing the modified state.

20. The computer-readable storage medium of claim 17, comprising instructions that when executed cause the computer to send a control directive with state information representing the modified state of the network resource to the network service during a second communication session, receive the network resource in the modified state from the network service, and present the network resource in the modified state on a display.

* * * * *